(12) United States Patent
Winarski et al.

(10) Patent No.: US 6,891,691 B2
(45) Date of Patent: May 10, 2005

(54) COMPENSATION OF DISK SPINUP ERRORS IN A DISK DRIVE

(75) Inventors: Daniel James Winarski, Tucson, AZ (US); Susan Encinas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 10/411,861

(22) Filed: Apr. 7, 2003

(65) Prior Publication Data

US 2004/0196586 A1 Oct. 7, 2004

(51) Int. Cl.[7] .............................................. G11B 19/20
(52) U.S. Cl. .................... 360/73.03; 360/69; 713/300
(58) Field of Search ............................. 360/73.03, 69, 360/71, 75; 713/300, 310, 320, 323, 324, 330; 318/254, 439

(56) References Cited

U.S. PATENT DOCUMENTS

| | | | |
|---|---|---|---|
| 5,168,484 A | | 12/1992 | Wachi et al. |
| 5,283,705 A | | 2/1994 | Iwabuchi |
| 5,418,659 A | | 5/1995 | Shergill |
| 5,574,920 A | * | 11/1996 | Parry .......................... 360/69 |
| 6,043,950 A | * | 3/2000 | Kim .......................... 360/73.03 |
| 6,072,652 A | * | 6/2000 | Lee .......................... 360/73.03 |
| 6,192,481 B1 | | 2/2001 | Deenadhayalan et al. ... 713/324 |
| 6,335,843 B2 | | 1/2002 | Yotsuya et al. |
| 6,449,725 B2 | | 9/2002 | Deenadhayalan et al. ... 713/324 |
| 6,483,297 B2 | | 11/2002 | Sobey |
| 6,489,738 B1 | * | 12/2002 | Bates et al. .................. 318/434 |
| 6,594,767 B1 | * | 7/2003 | Wiley et al. ................ 713/300 |
| 6,710,952 B1 | * | 3/2004 | Smith ...................... 360/73.03 |

FOREIGN PATENT DOCUMENTS

JP        61-239461 A        10/1986

OTHER PUBLICATIONS

"Hard Disk Drive Spindle Motor Excitation Function," IBM TDB vol. 32, No. 3 B, Aug. 1989, pp. 40–41.
"Stiction Warning System for Hard Disk Drive," IBM TDB vol. 37, No. 5, May 1994, pp. 491–492.
"Stiction Recovery Using Head Load/Unload Detector," IBM Research Disclosure #415109, Nov. 1998, p. 1549.

* cited by examiner

*Primary Examiner*—Sinh Tran
*Assistant Examiner*—James L Habermehl
(74) *Attorney, Agent, or Firm*—Allen K. Bates

(57) ABSTRACT

Disclosed are a system, a method, and a computer program product to disable the power-saving sleep mode of a disk drive if the drive detects an error at spinup that is a result of the read/write head sticking to the disk surface. The power saving sleep mode is avoided to prevent further spinup problems.

21 Claims, 4 Drawing Sheets

COMPENSATION OF DISK SPINUP ERRORS IN A DISK DRIVE

TECHNICAL FIELD

This invention relates in general to data recording disk drives, and more particularly to data recording disk drives and host computers having a means for disabling the low-power or no-power sleep-modes of the disk drives when these disk drives are experiencing either slider-disk stiction or spindle motor problems during spinup.

BACKGROUND OF THE INVENTION

Disk drives are information storage devices that use a rotatable disk with concentric data tracks containing the information, a head or transducer for reading and writing data with respect to the data tracks, and an actuator connected to a carrier for the head for moving the head to the desired track and maintaining it over the track centerline during read or write operations. There are typically a plurality of disks separated by spacer rings. The disks are stacked on a hub that is rotated by a spindle motor. A housing supports the spindle motor and head actuator and also surrounds the head and disk(s) to provide a substantially environmentally sealed container for the head-disk interface.

In conventional magnetic recording disk drives, the head carrier is an air-bearing slider that rides on a cushion of air above the disk surface when the disk is rotating at its suspension that connects the slider to the actuator. The slider is either biased toward the disk surface by a small spring force from the suspension, or is self-loaded to the disk surface by means of a negative-pressure air-bearing surface on the slider.

To improve the wear resistance of the disk and to maintain consistent magnetic properties, it is desirable to make the disk surface as smooth as possible. However, a very smooth disk surface may create a problem typically known the art as stiction. Stiction may occur after the slider has been in stationary contact with the disk for a period of time, resulting in the slider resisting translational movement or sticking to the disk surface. Stiction is caused by a variety of factors, including static friction and adhesion forces between the disk and slider created by the lubricant on the disk. Stiction in a disk drive can result in damage to the head and/or disk when the slider suddenly breaks free from the disk surface when disk rotation is initiated. In addition, damage to the suspension between the actuator and the slider may occur after the disk suddenly rotates. In some disk drives, such as low-power disk drives used in laptop and notebook computers, the spindle motor may simply be unable to initiate rotation or achieve operating speed because of the adhesion forces that cause excessive drag between the slider and the disk.

Disk drives without load/unload ramps operate with the slider in contact with the disk surface during start and stop operations when there is insufficient disk rotational speed to maintain the air bearing that lifts slider above the surface of the disk. To minimize the effect of stiction, disk drives without load/unload ramps often use a dedicated landing zone where the slider is parked when the drive is not operating. Typically, the landing zone is a specially textured non-data region of the disk. In contrast to disk drives without load/unload ramps, load/unload disk drives address the stiction problem by mechanically unloading the slider from the disk when the power is turned off, and then loading the slider back to the disk when the disk has reached a speed sufficient to generate the air bearing. The loading and unloading is typically done by means of a ramp that contacts the suspension when the actuator is moved away from the data region of the disk. The slider is thus parked off the disk surface with the suspension supported in a recess of the ramp.

Inherent failure mechanisms exist in disk drives either with or without load/unload ramps that can result in the slider coming to rest on the disk. For example, external shocks can displace the slider from the landing zone or the load/unload ramp, and errors in the microcode controlling the actuator can inadvertently cause the slider to land on the disk.

Stiction problems are not limited to conventional air-bearing disk drives. Liquid-bearing disk drives exhibit similar problems. Thus, in both air-bearing and liquid-bearing disk drives, it is desirable to find a means for not placing into a power saving sleep mode those disk drives that are experiencing stiction. Operation of a stiction-prone hard disk drive in a power saving sleep mode, followed by periods of spinup will exacerbate the stiction problem as it potentially allows the offending slider to repeatedly restick itself to the disk surface.

SUMMARY OF THE INVENTION

The present invention is a modified disk drive that includes means for disabling the power-saving sleep mode if the drive detects that the slider was previously stuck to the disks during drive startup or is currently experiencing problems with spinup. The power saving sleep mode is avoided if the spindle motor does not achieve its operating speed or is slow to spinup, if anti-stiction algorithms are executed, or if a head stuck error is detected during disk drive startup. By avoiding the power saving sleep mode and maintaining a disk drive that is difficult to spinup at its normal operating disk rotational speed, customer access to data will be enhanced and preserved.

For a fuller understanding of the nature and advantages of the present invention, reference should be made to the following detailed description taken together with the accompanying drawings.

DESCRIPTION OF THE PREFERRED EMBODIMENTS

Figure 1:
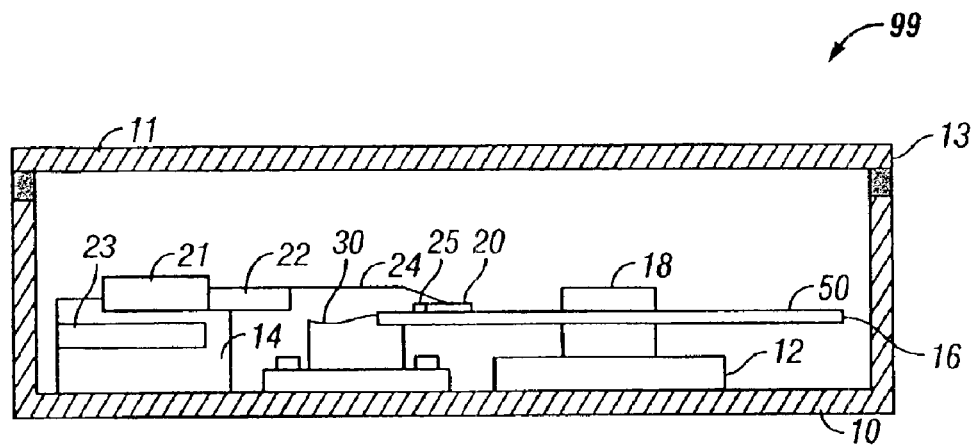
FIG. 1 shows a side view of a hard disk drive.
Figure 2:
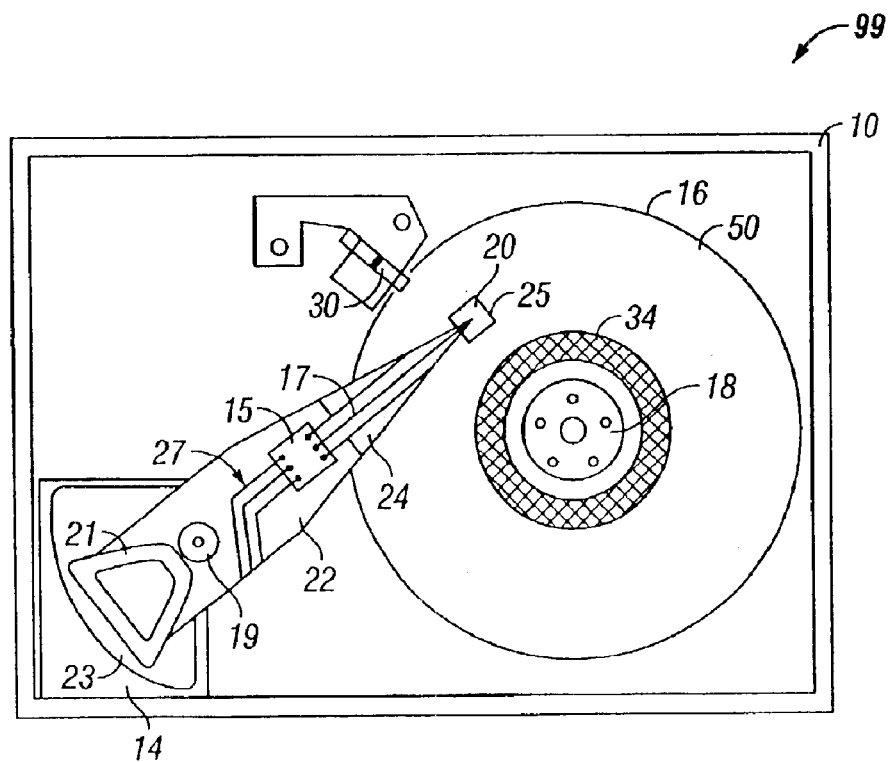
FIG. 2 shows a top view of a hard disk drive.

Referring first to FIG. 1, there is illustrated in sectional view a schematic of a disk drive 99 according to the present invention. For ease of illustration and explanation, the disk drive 99 depicted in FIGS. 1 and 2 is shown as having a single recording head and associated disk surface, although conventional disk drives typically have multiple heads, one on each side of multiple disks and the present invention applies to multiple disk/head and single disk/head drives. The disk drive 99 comprises a base 10 to which are secured a spindle motor 12, an actuator 14 and a cover 11. The base 10 and cover 11 provide a substantially sealed housing for disk drive 99. Typically, there is a gasket 13 located between base 10 and cover 11. A small breather port (not shown) for equalizing pressure between the interior of disk drive 99 and the outside environment is typically placed in a base 10. This type of disk drive is described as being substantially sealed because the spindle motor 12 is located entirely within the housing and there is no external forced air supply for cooling the interior components. A magnetic recording disk 16 is connected to spindle motor 12 by means of spindle or hub 18 for rotation by spindle motor 12. A thin film 50 of lubricant is maintained on the surface of disk 16. The lubricant may be a conventional perfluoro-polyether (PFPE) disk lubricant, such as Demnum SP brand manufactured by Daikin or Z-DOL brand manufactured by Montedison. A read/write head or transducer 25 is formed on the trailing end of an air-bearing slider 20. Transducer 25 typically has an inductive write transducer and either a magnetoresistive (MR) or a giant magnetoresistive (GMR) read transducer, all of which are formed by thin-film deposition techniques as is known in the art. The slider 20 is connected to the actuator 14 by means of a rigid arm 22 and a flexible suspension 24. The flexible suspension 24 providing a biasing force which urges the slider 20 towards the surface of the recording disk 16. The arm 22, flexible suspension 24, and slider 20 with transducer 25 are referred to as the head-arm assembly. During operation of disk drive 99, the spindle motor 12 typically rotates the disk 16 at a constant angular velocity (CAV), and the arm 22 rotates about pivot 19 to move slider 20 in an arc that is aligned generally radially across the surface of disk 16, so that the read/write transducer 25 may access different data tracks on disk 16. The actuator 14 is typically a rotary voice coil motor (VCM) having a coil 21 that moves through the fixed magnetic field of magnet assembly 23 when current is applied to coil 21.

FIG. 2 is a top view of the interior of disk drive 99 with the cover 11 removed, and illustrates in better detail flexible suspension 24. Flexible suspension 24 provides a force to the slider 20 to urge it toward the disk 16. The suspension may be a conventional type of suspension such as the well-known Watrous suspension, as described in U.S. Pat. No. 4,167,765. This type of suspension also provides a gimbaled attachment of the slider 20 that allows the slider 20 to pitch and roll as it rides on the air bearing. The data detected from disk 16 by transducer 25 is processed into a data readback signal by an integrated circuit signal amplification and processing circuit in arm electronics (AE) 15, located on arm 22. The signals between transducer 25 and arm electronics 15 travel via flex cable 17. The signals between arm electronics 15 and I/O channel 112 (FIG. 3) travel via cable 27.

In the load/unload embodiment of disk drive 99, a load/unload ramp 30 (FIG. 2, FIG. 3) is mounted to the base 10. Ramp 30 contacts suspension 24 and lifts the slider 20 away from disk 16 when the actuator 14 rotates the slider 20 toward the outside diameter of disk 16 when disk drive 99 is powered down. Such powering down can include a power-saving sleep mode when disk drive 99 has been inactive for a predetermined period of time. If disk drive 99 does not utilize a load/unload ramp 30, disk 16 typically has a dedicated textured landing zone 34 near the inside diameter of disk 16, away from the data region. Disk drive 99 moves slider 20 to textured landing zone 34 when disk drive 99 is powered down. Disk drive 99 may have both a load/unload ramp 30 and a textured landing zone 34.

In general, the preferred parking location for the actuator 14 when disk drive 99 is stopped will be its usual storage location, i.e., either with the slider 20 unloaded off the disk 16 onto load/unload ramp 30 (for a load/unload drive) or with the slider 20 in contact with the textured surface of disk 16 at landing zone 34 (for a non-load/unload drive). At these locations, the slider 20 is not in contact with the smooth data region of the disk and the disk drive can be started using normal startup procedures. However, in the event the slider 20 comes to rest on the smooth data region of disk 16, the spindle motor 12 may not have sufficient torque to overcome the stiction and start the disks spinning, and the transducer 25, suspension 24, or disk 16 could become damaged if slider 20 suddenly broke free from its stuck position.

Figure 3:
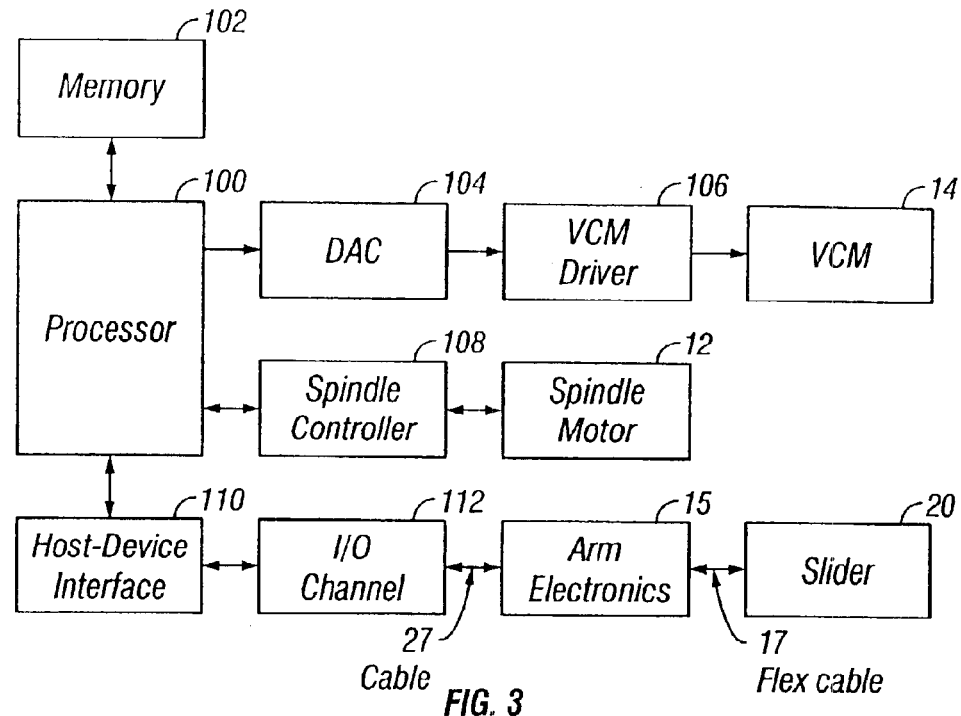
FIG. 3 shows the control circuitry of a hard disk drive.

Referring now to FIG. 3, drive electrical components include a processor 100 that processes instructions contained in memory 102. Processor 100 may comprise an off the shelf processor, custom processor, FPGA (Field Programmable Gate Array), ASIC (Application Specific Integrated Circuit), discrete logic, etc. Memory 102 may comprise random access memory (RAM) and/or nonvolatile memory and is typically used to hold variable data, stack data, executable instructions, etc. The nonvolatile memory may comprise any type of nonvolatile memory such as EEPROM (Electrically Erasable Programmable Read Only Memory), flash PROM (Programmable Read Only Memory), battery backup RAM, hard disk drive, etc. Processor 100 sends digital signals to digital-to-analog converter (DAC) 104, for conversion to low-power analog signals. These low-power analog signal are recieved by VCM driver 106. VCM driver 106 amplifies the low-power analog signals into high-power signals to drive VCM 14. Processor 100 also controls and is connected to the spindle motor 12 via spindle controller 108. VCM 14 is energized by the VCM driver 106 which receives analog voltage signals from DAC 104. VCM driver 106 delivers current to the coil of VCM 14 in one direction to pivot the head-arm assembly radially outward and in the opposite direction to pivot the head-arm assembly radially inward. The spindle controller 108 controls the current to the armatures of spindle motor 12 to rotate the motor at a constant rotational speed during drive operation. Constant rotational speed is also known as constant angular velocity (CAV). In addition, the spindle controller 108 provides a status signal to processor 100 indicating whether or not spindle motor 12 is rotating at its operating speed. In the preferred embodiment, this is a signal generated from the back electromotive force (BEMF) voltage from spindle motor 12 which will have a nonzero value when motor 12 is rotating. Spindle motor 12 is commonly a brushless DC motor with three windings or three sets of windings. Spindle motor 12 typically has ball bearings for low rotational speed drives (revolutions per minute) RPM less than 10000. For high speed disk drives (10000 to 15000 RPM), fluid bearings may be used.

Host-device interface 110 communicates with processor 100. Additionally, host-device interface 110 receives data from host computer 120 (FIG. 4) and sends the data to I/O channel 112, where the data is encoded before being sent via cable 27, to arm electronics 15. From arm electronics 15, the encoded data is sent via flex cable 17 to the inductive write transducer on slider 20 resulting in the encoded data being written to disk 16. Similarly, when data is requested by host computer 120, the MR or GMR read transducer on slider 20 reads the encoded data off of disk 16, and sends that data to arm electronics 15 via flex cable 17. From arm electronics 15, the encoded data is sent via cable 27 to be decoded by I/O channel 112 before being sent to host computer 120 via host-device interface 110.

Figure 4:
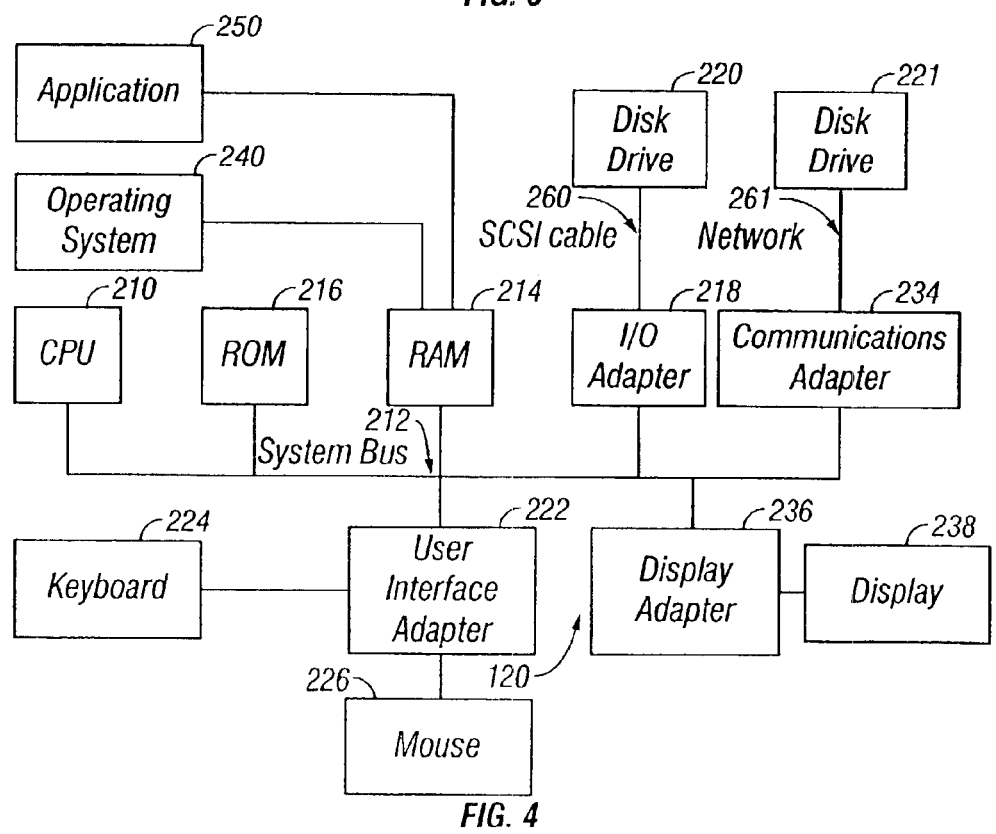
FIG. 4 shows a computer system utilizing a hard disk drive.

FIG. 4 illustrates a typical hardware configuration of a host computer 120 utilizing the disk drive 99 shown in FIGS. 1 and 2. Host computer 120 has a central processing unit (CPU) 210 coupled to various other components by system bus 212. An operating system 240, runs on CPU 210 and provides control of host computer 120 and the attached disk drives 220 and 221. Operating system 240 is the preferred location for controlling the threshold of I/O inactivity, where disk drive inactivity of a time in excess of this threshold results in disk drives 220 and 221 being directed to operate in a power saving sleep mode. Alternately, processor 100 of each disk drive could control the threshold of I/O activity, where disk drive inactivity of a time in excess of this threshold results in disk drives 220 and 221 being directed to operate in a power saving sleep mode. Such a period of inactivity could be encountered when application 250 did not make I/O demands on disk drives 220 or 221 for a length of time. Similarly, such a period of inactivity could also be encountered when a user did not make I/O queries to disk drives 220 or 221 via keyboard 224 or mouse 226 for a length of time. Keyboard 224 and mouse 226 are connected to system bus 212 via user interface adapter 222.

Read only memory (ROM) 216 is coupled to system bus 212 and includes a basic input/output system (BIOS) that controls certain functions of computer 120. Random access memory (RAM) 214, I/O adapter 218, and communications adapter 234 are also coupled to system bus 212. It should be noted that software components including operating system 240 and application 250 are loaded into RAM 214. RAM 214 is the primary operation memory of computer 120. I/O adapter 218 may be a small computer system interface (SCSI) adapter. SCSI cable 260 is connected between I/O Adapter 218 and Host-Device Interface 110 (FIG. 3). SCSI cable 260 enables host computer 120 to communicate with disk drive 220. Similarly, communications adapter 234 communicates with Network Attached Storage (NAS) disk drive 221 via network 261. Communications adapter 234 may be an Ethernet, Fiber Channel, ESCON, FICON, Wide Area Network (WAN), or TCP/IP interface.

A display monitor 238 is connected to system bus 212 by display adapter 236. In this manner, a user is capable of receiving visual messages and/or error messages concerning the disablement of the power-saving sleep-mode.

Figure 5:
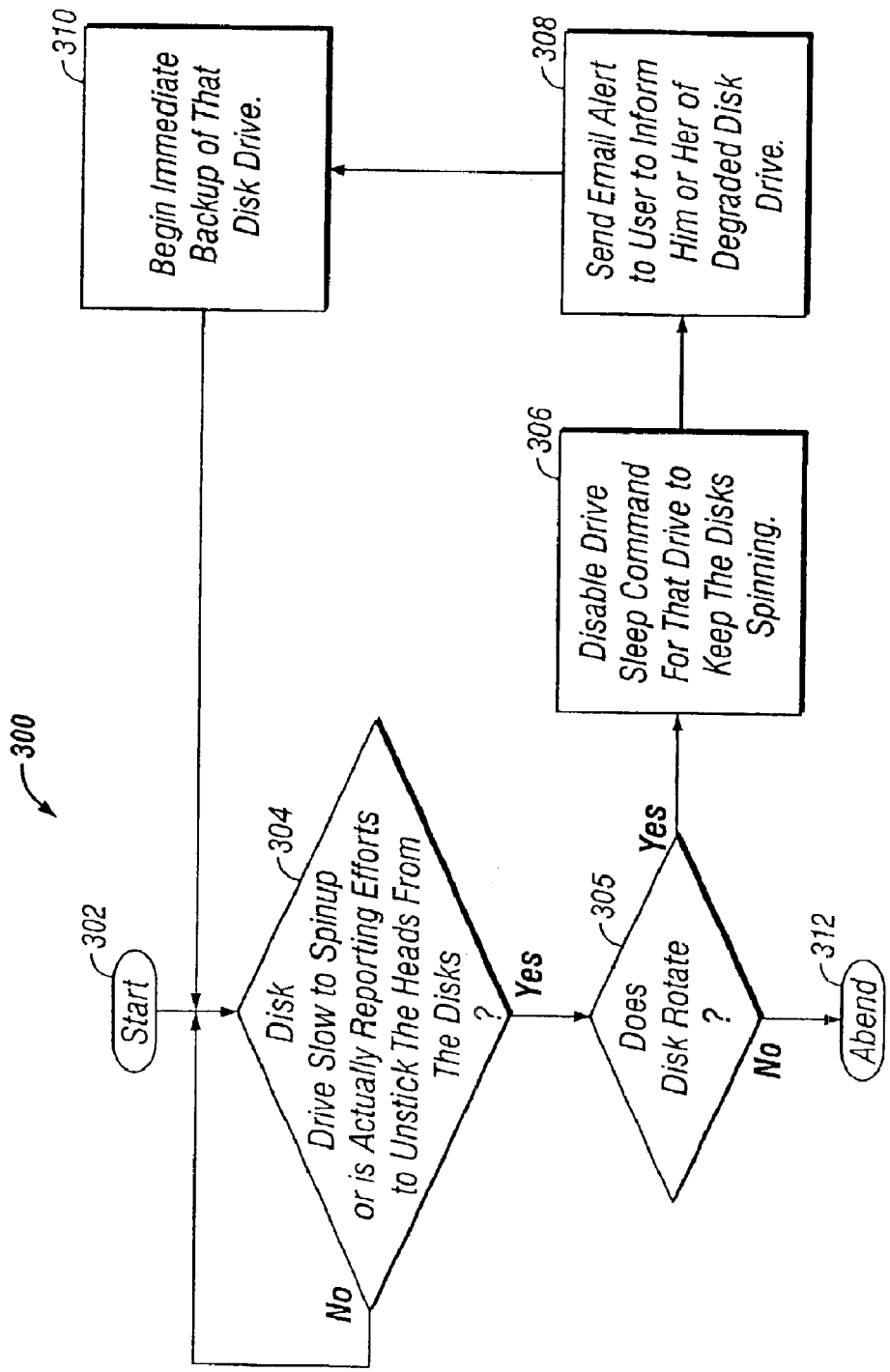
FIG. 5 shows a flowchart disabling the sleep mode of the hard disk drive when that hard disk drive experiences stiction.

FIG. 5 shows flowchart 300, for disabling the sleep mode when the disk drive is experiencing spinup problems. At step 304, processor 100 detects whether disk drive 99 in host computer 120 is experiencing spinup problems. Disk drive 99 does not have to be a part of host computer 120 for use of this invention. Spinup problems may be detected by a relatively slow spinup, anti-stiction operations executed by the drive or other signals and/or errors indicating that disk drive 99 is having difficulty during spinup.

Stiction is the condition where the head, slider 20, transducer 25 or other components in contact with or in close proximity to disk 16 of the disk drive 99 stick to the disk 16.

At step 304 a timer may be used that measures the duration in time from when disk drive 99 is commanded to spin up until disk drive 99 issues a "drive ready" through host-device interface 110. Such a "drive ready" is typically issued in response from a "test unit ready" issued by host computer 120 to drive 99. The test unit ready command is a SCSI (small computer system interface) command. The use of this invention is not limited to SCSI commands to measure the time to spin up disk drive 99. Other commands or signals with respect to disk drive 99 may be used to establish a time to spin up. The timer may be implemented in processor 100, host computer 120, a dedicated hardware timer device or other devices known in the art. By measurement of the time to spin up the disk of disk drive 99 it is possible to compare the time to spin up to a acceptable time to spin up that is used as a threshold to determine if the disk drive 99 is experiencing a problem with spin up. If disk drive 99 does not spin up and become ready for I/O such that the time to spin up is greater than the acceptable time to spin up then step 304 flows to step 305. It is possible to use different criterion to determine the acceptable time to spin up. The specifications supplied with disk drive 99 at the time of manufacture may be used to determine the acceptable time to spin up or user input may determine the acceptable time to spin up. The acceptable time to spin up used will vary with the type, manufacturer and the use of the disk drive.

Alternately in step 304, the drive could use a zero or negligible BEMF from motor 12 as a status of disk 16 not spinning, and indicate that the process would flow to step 305. In this case, the spindle controller 108 provides a status signal to processor 100 indicating that spindle motor 12 is not rotating at its operating speed. Spindle controller 108, measures the signal generated from the back electromotive force (BEMF) voltage from spindle motor 12 and compares it to a threshold voltage level. If the BEMF is lower than the threshold voltage then spindle controller 108 provides a status signal to processor 100 indicating that the disk 16 is not rotating or is rotating at less than the normal rotational speed. The status signal may be in the form a disk spinup error signal when the disk 16 is not rotating or is rotating at less than the normal rotational speed. Other methods may be used with the present invention to determine if disk 16 is not rotating or is rotating at less than the normal rotational speed. Tachometers, sensors, or other methods know in the art may be applied. The measured disk 16 rotational speed or a signal representing the disk 16 rotational speed is compared to an acceptable rotational speed. If the disk 16 rotational speed or a signal representing the disk 16 rotational speed is less than the acceptable rotational speed then step 304 flows to step 305.

Additionally, disk drive 99 could issue an error to host computer 120, that it is invoking algorithms to overcome stiction and/or that a head stuck error exists. A head stuck error is an error condition indicating that the head, slider 20, transducer 25 or other components in contact with or in close proximity to disk 16 of the disk drive 99 may be stuck to disk 16 or there may be relatively large friction relative to disk 16. When a head stuck error occurs disk drive 99 may issue a head stuck error to host computer 120. Such an algorithm is documented in U.S. Pat. No. 5,384,675. U.S. Pat. No. 5,384,675 teaches processor 100, of FIG. 3, exciting coil 21 of voice coil motor actuator 14 to unstick slider 20 from disk 16. Processor 100 generates a digital pulse train which is converted to a train of alternating positive and negative current pulses by VCM driver 106 (FIG. 3) and then applied to coil 21 of voice coil motor actuator 14 to oscillate the carrier radially in and out. This carrier is typically air-bearing slider 20. The positive current pulses having a pulse duration or an amplitude different from the pulse duration or amplitude, respectively, of the negative current pulses to simultaneously move the oscillating carrier in a net radial direction across disk 16 when slider 20 and disk 16 are sticking together. The frequency of the current pulses may match the resonant frequency of arm 22. If the spinup time is excessive, no BEMF is sensed, or the disk drive invokes an anti-stiction algorithm, a disk spinup error has occurred, then step 304 flows to step 305.

Decision step 305 determines if disk 16 does not rotate during a spinup operation. If disk 16 will rotate, the process flows to step 306. Otherwise, the process flows to abend at step 312. Abend step 312 denotes that disk 16 cannot be spun up and that disk drive 99 is inoperable and must be replaced.

At step 306, a first error recovery procedure is executed to disable the drive sleep command. A command to disable the drive sleep mode of operation may be issued by host computer 120 or disk drive 99 itself. If the drive is having problems spinning up, it is not desirable to have host computer 120 or disk drive 99 to command the drive sleep mode of operation and thus spindown disks 16 and allowing the problem to repeatedly reoccur. The preferred means of disabling the drive sleep command is to set the threshold in time, of the period of inactivity which would trigger the drive sleep command, to a very large number, such as 100 hours or more, in host computer 120 and/or processor 100. An alternate means of disabling the drive sleep command is simply to block further issuance of this command by either host computer 120 or processor 100. Drive sleep mode in the context of this invention is meant to include any mode of operation of the disk drive that results in the disk 16 ceasing to rotate.

Step 306 flows to step 308, where the user is notified that the troublesome disk drive is degraded and should be replaced. Any network or host computer administrator could be notified in the same email, or via SNMP (Simple Network Management Protocol). A disk spinup error message is reported to the user. The error message may have additional information related to the error if necessary. Finally the process flows to step 310, where an immediate backup of data is made from the troublesome disk drive by host computer 120. Other computers or devices associated with host computer 120 and/or disk drive 99 may also be used to make a backup copy of the troublesome disk drive. This backup could be exact replica of the contents of the troublesome disk drive made to another disk drive in host computer 120, an alternate form of data storage such as a tape drive, or to a network server. Alternatively only critical information may be copied from the troublesome disk drive to the backup storage device. The storage device that contains the contents of the troublesome disk drive may be used as a substitute and/or replacement to continue operation of the system or device that previously used the troublesome disk drive. As a further embodiment, once the data is backed up on another storage device, further I/O operations to the troublesome disk drive could be curtailed and the troublesome disk drive replaced. The result would be to disable the operation of the troublesome disk drive. If the troublesome disk drive is in a RAID (Redundant Array of Independent Disks), then the backup of the data could be to a spare drive in the RAID.

Figure 6:
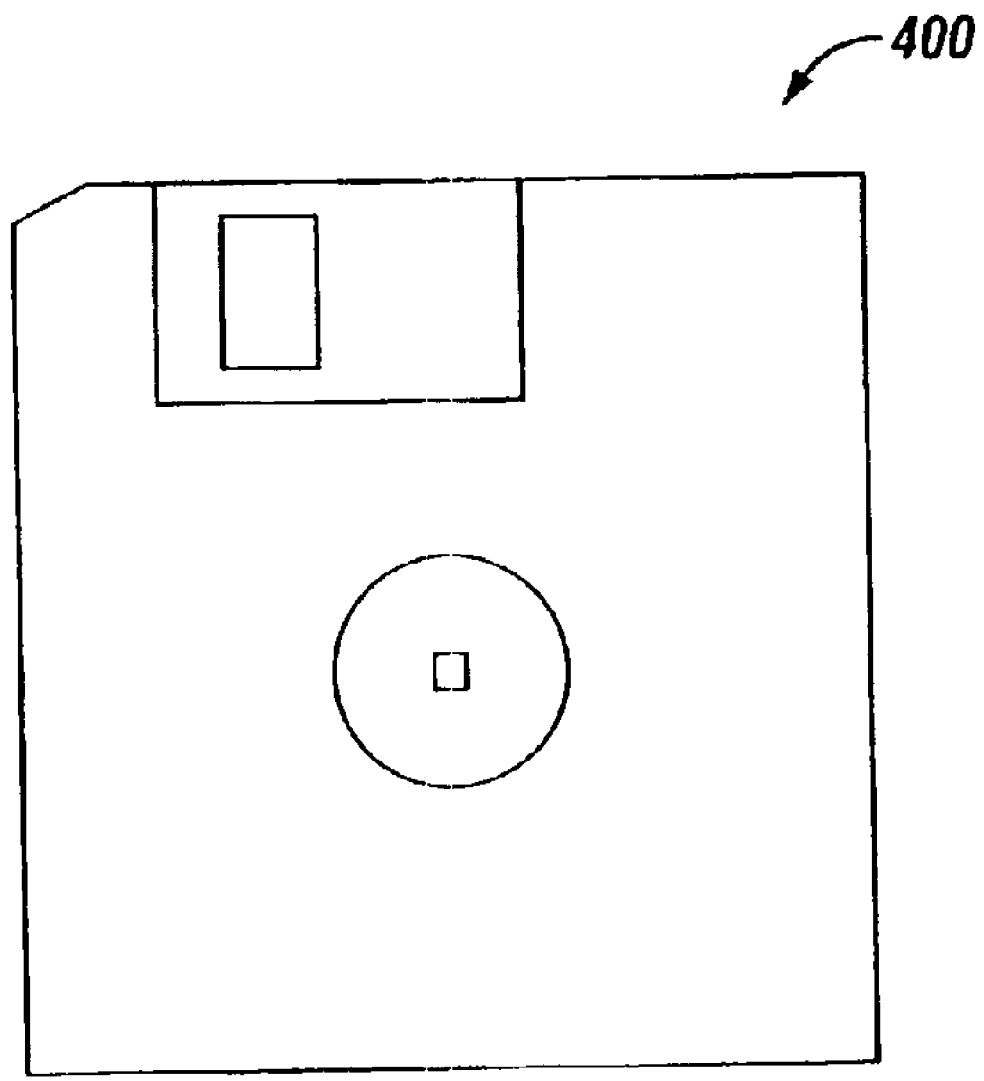
FIG. 6 shows an information bearing medium.

FIG. 6 depicts an information bearing medium or computer-readable medium, in the form of a floppy disk 400. The information bearing medium may be used to store the instructions in flowchart 300 of FIG. 5, for execution. Alternatively other storage devices may be used to store the instructions.

While the preferred embodiments of the present invention have been illustrated in detail, it should be apparent that modifications and improvements may be made to the invention without departing from the spirit and scope of the invention. The invention also applies to other storage devices including a disk drive that operates as a near field recording disk drive employing magneto-optical media.

We claim:

1. A method for compensating for a disk spinup error in a disk drive, comprising:
   detecting said disk spinup error in said disk drive; and
   preventing said disk drive from operating in a sleep mode.

2. The method of claim 1, wherein the detecting step further comprises the step of:
   detecting a time to spinup that is greater than an acceptable time to spin up.

3. The method of claim 1, wherein the detecting step further comprises the step of:
   detecting a disk rotational speed that is less than an acceptable rotational speed.

4. The method of claim 1, wherein the detecting step further comprises the step of:
   detecting a head stuck error.

5. The method of claim 1, comprising the additional step of:
   displaying a disk spinup error message for said disk drive.

6. The method of claim 1, comprising the additional steps of:
   copying the contents of said disk drive to a storage device; and
   disabling the operation of said disk drive.

7. The method of claim 6, comprising the additional steps of:
   using said storage device as a replacement for said disk drive.

8. A system for compensating for a disk spinup error in a disk drive, comprising:
   a spindle controller that generates a disk spinup error signal; and
   a processor that in response to detecting said disk spinup error signal in said disk drive prevents said disk drive from operating in a sleep mode.

9. The system of claim 8, further comprising:
   a timer that determines a time to spinup for said disk drive.

10. The system of claim 8, wherein said spindle controller determines if a disk rotational speed is less than an acceptable rotational speed for said disk drive.

11. The system of claim 8, wherein said processor detects a head stuck error.

12. The system of claim 8, further comprising:
   a display monitor for displaying a disk spinup error message for said disk drive.

13. The system of claim 8, further comprising:
   a storage device; and
   a computer that copies the contents of said disk drive to said storage device.

14. The system of claim 13, wherein said computer disables said disk drive and uses said storage device as a replacement for said disk drive.

15. A computer program product on a computer-readable medium usable with a programmable computer, said computer program product having computer readable program code embodied therein for compensating for a disk spinup error in a disk drive, comprising:
   computer readable program code which causes said disk drive to detect said disk spinup error in said disk drive; and
   computer readable program code which causes said disk drive to prevent said disk drive from operating in a sleep mode.

16. The computer program product of claim 15, further comprising:

computer readable program code which causes said disk drive to detect a time to spinup that is greater than an acceptable time to spin up.

17. The computer program product of claim 15, further comprising:

computer readable program code which causes said disk drive to detect a disk rotational speed that is less than a acceptable rotational speed.

18. The computer program product of claim 15, further comprising:

computer readable program code which causes said disk drive to detect a head stuck error.

19. The computer program product of claim 15, further comprising:

computer readable program code which causes a computer to display a disk spinup error message on a display monitor.

20. The computer program product of claim 15, further comprising:

computer readable program code which causes a computer to copy the contents of said disk drive to a storage device; and computer readable program code which causes said computer to disable the operation of said disk drive.

21. The computer program product of claim 20, further comprising:

computer readable program code which causes said computer to use said storage device as a replacement for said disk drive.

* * * * *